Aug. 31, 1954     H. D. HURT     2,687,619

BEVERAGE FREEZING AND COOLING DEVICE

Filed July 9, 1952

INVENTOR.
HANSFORD D. HURT
BY *Herman L. Gordon*
ATTORNEY

Patented Aug. 31, 1954

2,687,619

UNITED STATES PATENT OFFICE 2,687,619

BEVERAGE FREEZING AND COOLING DEVICE

Hansford D. Hurt, Arlington, Calif.

Application July 9, 1952, Serial No. 297,829

6 Claims. (Cl. 62—1)

This invention relates to liquid cooling devices, and more particularly to a device for cooling or chilling beverages.

A main object of the invention is to provide a novel and improved beverage freezing and cooling device which is simple in construction, which is easy to use, and which provides rapid chilling or cooling of beverages for serving.

A further object of the invention is to provide an improved beverage chilling or cooling device which is inexpensive to manufacture, which is sturdy in construction, and which involves only a few parts.

A still further object of the invention is to provide an improved beverage cooling and chilling device which is easy to clean, which is convenient to handle, and which is highly durable.

Further objects and advantages of the invention will become apparent from the following description and claims, and from the accompanying drawings, wherein:

Figure 1:
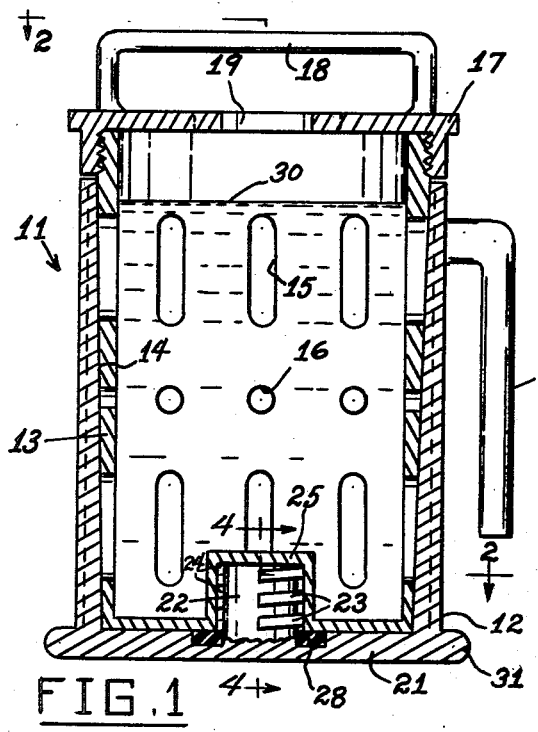
Figure 1 is a vertical cross-sectional view taken through an improved beverage chilling device according to the present invention shown assembled for freezing a quantity of beverage in the inner container thereof.

A main purpose of the present invention is to provide a method and means for freezing and cooling soft drinks or beverages in the home or in places where beverages are sold.

The device and procedure of the present invention may be employed with maximum advantage in those homes or commercial establishments equipped with modern refrigerators or deep freeze units; however the apparatus and technique described herein may also be employed with refrigerators of the older type which are equipped to make ice cubes and have a freezing compartment for this purpose.

The perforated inner freezing container presently to be described may also be employed as a container for broken or cubed ice, and may be inserted in a pitcher or other beverage container, thus eliminating the inconvenience of using floating ice in an open vessel.

The technique and apparatus of the present invention are also useful for cooling drinks and beverages at fountains or restaurants where beverages are sold directly to the public in glass or other containers, and in one form of the invention, means are provided for rigidly connecting the inner freezing container of the device inside a container designed for dispensing soft drinks and other beverages at fountains or restaurants.

An important purpose of the present invention is to enable the housewife to freeze her own beverages into a solid form convenient to handle, the beverage ices being frozen from the same beverages which are to be subsequently cooled. It is also an important purpose of the invention to provide a container for holding cracked or cubed ices, which also serves as a freezing container for producing specially mixed beverage ices.

A more specific purpose of the invention is to enable those having large efficient freezing space to avoid water ice dilution of their cooled soft beverages, by freezing a cylindrical body of ice made from the same beverage which is to be cooled thereby.

Referring to the drawings, wherein like reference numerals refer to corresponding parts throughout the several views, 11 generally designates a beverage freezing assembly comprising an outer container 12, and 13 designates an inner container which fits within and is detachably secured to said outer container.

The outer container 12 is generally cylindrical and has a downwardly tapering inside wall surface 14. The inner container 13 has a downwardly tapering external wall surface which closely engages the tapered wall surface 14. The inner container 13 is rotatable in the outer container 12. The tapered meeting wall surfaces of the containers facilitate the withdrawal of the inner container 13 from the outer container 12 after a quantity of beverage has been frozen in the inner container.

The inner container 13 is formed with slots 15 and apertures 16 distributed over its wall area. Threadedly engaged on the top portion of said inner container is the top cover 17, said cover being formed with the diametrically extending handle 18. Formed in the top cover 17, in preferably offset relationship to the handle 18, is an opening 19 through which beverage may be poured into container 13 preparatory to freezing same.

The outer container 12 is preferably formed with a ribbed or corrugated external surface, such as with the vertical ribs 20, to increase the heat transfer area of the container and to rigidify the container wall. The bottom wall of the outer container is shown at 21.

Figure 3:
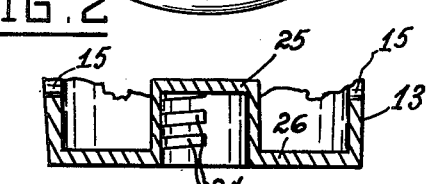
Figure 3 is a fragmentary vertical cross-sectional view taken through the lower central portion of the inner container of the beverage chilling device.
Figure 4:
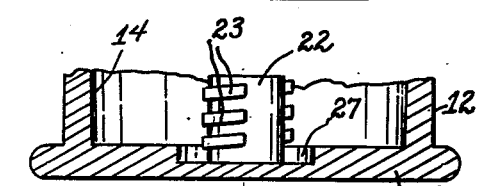
Figure 4 is a fragmentary vertical cross-sectional view taken through the lower central portion of the outer container of the beverage chilling and freezing device substantially on the line 4—4 of Figure 1.

Bottom wall 21 is formed with a central vertical upstanding stud 22. Stud 22 is formed with the male segment threads 23, said threads being lockingly engageable with female segment threads 24 formed on the inner surface of a hollow boss or socket 25 provided centrally on the bottom wall 26 of the inner container 13. As shown in Figures 1, 3 and 4, the threads 23 and 24 are equal in angular extent and are separated by the same angles as subtended by the threads, whereby the socket 25 may be fitted over the stud 22 with the threads 24 inserted between the threads 23, and whereby the inner container 13 may be locked in the outer container 12 by rotating the inner container to engage the threads 24 with the threads 23.

The bottom wall 21 is formed with the annular counterbore 27 around the stud 22, and seated in seat counterbore is the annular gasket 28, of resilient deformable material, such as rubber or the like, to seal the space within the hollow boss 25.

The outer container 12 is provided with a suitable handle 29 rigidly secured thereto, as by being integrally formed therewith, as shown.

In using the freezing assembly 11, the inner container 13 is placed inside the outer container 12 and is locked therein as above described. Beverage is then poured into the inner container through the opening 19, to a level less than full, as shown for example in Figure 1, where the liquid is designated at 30, to allow for expansion of the liquid due to freezing. The assembly 11 is then placed in the freezing compartment of a refrigerator or deep freeze cabinet to freeze the liquid 30 to a solid state. After the beverage is frozen solid, the assembly 11 is removed from the freezing chamber and the outside container 12 is then dipped in water or rotated under a running water faucet to defrost the outer container and loosen same with respect to the inner container 13.

The inner container may then be removed by disengaging the segment threads 23 and 24, whereupon the inner container 13, containing the frozen beverage 30, is ready for placement and use within a pitcher or other vessel for cooling the desired mixed or soft beverage.

The bottom wall 21 of the outer container 12 is preferably provided with an extended rim 31, which, together with handle 29, facilitates the manipulation of the outer container.

Figure 5:
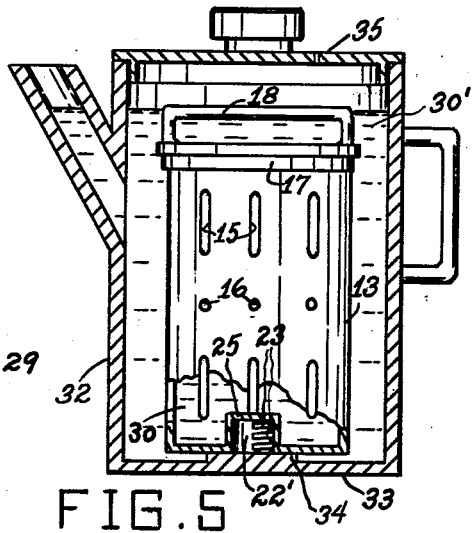
Figure 5 is a vertical cross-sectional view of a pitcher for serving chilled beverages, constructed in accordance with the present invention and having the inner container of Figure 1 mounted therein, said inner container having solid frozen beverage therein.

Referring to Figure 5, 32 designates a pitcher having a bottom wall 33 formed with a central boss 34. Boss 34 is formed centrally with an upstanding vertical stud 22' having the male segment threads 23 and being identical with the stud 22 of the freezing container 12. As shown in Figure 5, the inner container 13, containing the frozen beverage 30, is mounted on the boss 34 and over the stud 22' and is locked with said stud by interengaging the female segment threads 24 with the male segment threads 23 of said stud, namely, by rotating the inner container 13 after the socket element 25 thereof has been slipped over the stud 22'. The beverage to be cooled, designated at 30', is then poured into the pitcher. The beverage may then be stirred to increase the rate of chilling thereof.

The pitcher 32 may be provided with a cover 35, as shown in Figure 5.

Figure 6:
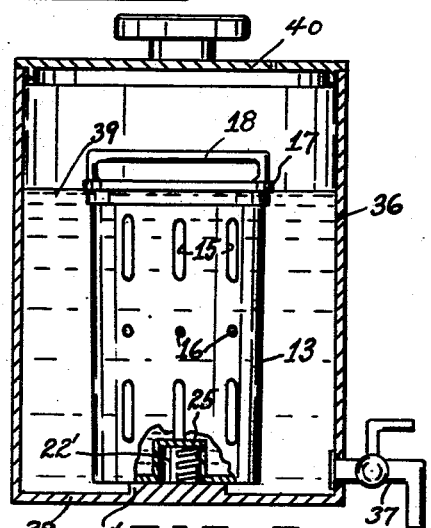
Figure 6 is a vertical cross-sectional view of a beverage dispensing container for serving chilled beverages constructed in accordance with the present invention and having the inner container of Figure 1 mounted therein, said inner container having solid frozen beverage therein.
Figure 2:
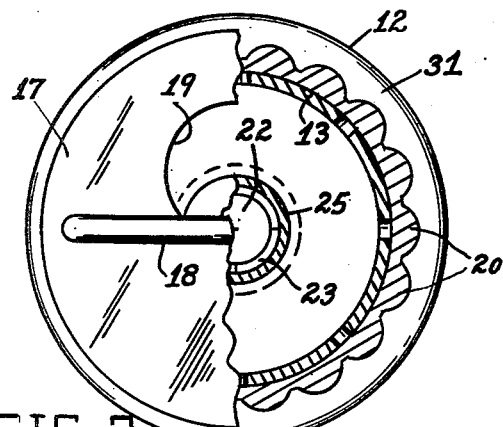
Figure 2 is a horizontal cross-sectional view taken on line 2—2 of Figure 1.

Referring to Figure 6, 36 designates a beverage dispensing container suitable for use at a fountain or restaurant, said container having a faucet 37 and having its bottom wall 38 formed with a central boss 34', as in Figure 5, said central boss being formed with the vertical stud 22' adapted to be lockingly engaged with the socket element 25 of the inner container 13. It will be understood that the inner container 13 is engaged on the stud 22' in the same manner as in Figure 5, and that the beverage to be cooled, designated at 39, is poured into the container 36 around the inner container 13, whereby the beverage 39 is cooled by the frozen beverage contained in the inner container. The dispensing container 36 is provided with the removable top cover 40, as shown.

While certain specific embodiments of beverage freezing and cooling devices have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A beverage freezing device comprising an outer container, an inner container adapted to contain beverage to be frozen, substantially the entire external surface of said inner container being engageable in surface contact with substantially the entire inside surface of the outer container and said inner container being rotatable in said outer container, said inner container being formed with apertures in its wall, and interengaging segment threads arranged centrally on the bottom of the inner container and the bottom wall of the outer container, whereby the inner container may be secured to the bottom wall of the outer container by moving the inner container axially into the outer container and then rotating the inner container in the outer container through a relatively small angle.

2. A beverage freezing device comprising an outer container having a ribbed outer surface and a tapered inner surface, an inner container adapted to contain beverage to be frozen, said inner container being provided with a tapered outer surface engageable in surface contact with the inside surface of the outer container and being rotatable in said outer container, said inner container being formed with apertures in its container wall, and interengaging segment threads arranged centrally on the bottom of the inner container and the bottom wall of the outer container, whereby the inner container may be secured to the bottom wall of the outer container by moving the inner container axially into the outer container and then rotating the inner container in the outer container through a relatively small angle.

3. A beverage freezing device comprising an outer container having a ribbed outer surface and a tapered inner surface, an inner container adapted to contain beverage to be frozen, said inner container being provided with a tapered outer surface engageable in surface contact with the inside surface of the outer container and being rotatable in said outer container, said inner container being formed with apertures in its wall, interengaging segment threads arranged centrally on the bottom of the inner container and the bottom wall of the outer container, whereby the inner container may be secured to the bottom wall of the outer container by moving the inner container axially into the outer container and then rotating the inner container in the outer container through a relatively small angle, and an annular sealing gasket of resilient deformable material between the bottom of the inner container and the bottom wall of the outer container around the axis of the segment threads to seal the space adjacent the segment threads, whereby frozen liquid is excluded from said space.

4. A beverage freezing device comprising an outer container, an inner container adapted to contain beverage to be frozen, said inner container being engageable in surface contact with the inside wall surface of the outer container and being rotatable in said outer container, said inner container being formed with apertures in its wall, a hollow socket carried centrally on the bottom wall of said inner container, an upstanding stud secured centrally on the bottom wall of said outer container and being receivable in said socket, interengaging segment threads on said stud and the inner surface of the socket, whereby the inner container may be secured to the bottom wall of the outer container by moving the inner container axially into the outer container and then rotating the inner container in the outer container through a relatively small angle, and an annular sealing gasket of resilient deformable material between the bottom of the inner container and the bottom wall of said outer container arranged around said stud to seal the space adjacent the segment threads, whereby frozen liquid is excluded from said space.

5. A beverage chilling device comprising an outer container, an inner container for frozen beverage, said inner container being formed with apertures in its wall, a socket element on the bottom wall of the inner container, spaced locking projections in said socket element, an upstanding stud on the bottom wall of said outer container arranged to be received in said socket element, substantially the entire external surface of said inner container being engageable in surface contact with substantially the entire inside surface of the outer container when the socket element is lowered vertically over the stud, and locking projections on said stud arranged to lockingly interengage with the projections in the socket element when the socket element is rotated through a relatively small angle around the axis of said stud.

6. A beverage chilling device comprising an outer container, an inner container for frozen beverage, said inner container being formed with apertures in its wall, a socket element on the bottom wall of the inner container, spaced internal segment threads in said socket element, an upstanding stud on the bottom wall of said outer container adapted to be received in said socket element, substantially the entire external surface of said inner container being engageable in surface contact with substantially the entire inside surface of the outer container, and external segment threads on said stud arranged to lockingly interengage with the segment threads in the socket element when the socket element is rotated through a relatively small angle around the axis of said stud.

References Cited in the file of this patent

UNITED STATES PATENTS

| Number | Name | Date |
| --- | --- | --- |
| 379,823 | Shaw | Mar. 20, 1888 |
| 512,109 | Hinman | Jan. 2, 1894 |
| 803,636 | Stein | Nov. 7, 1905 |
| 1,954,370 | Solomon | Apr. 10, 1934 |
| 2,021,495 | Anderson | Nov. 19, 1935 |

FOREIGN PATENTS

| Number | Country | Date |
| --- | --- | --- |
| 172,798 | Great Britain | Dec. 22, 1921 |